United States Patent
Soddemann et al.

(10) Patent No.: US 9,120,918 B2
(45) Date of Patent: Sep. 1, 2015

(54) FINE-PARTICLE, STABLE SUSPENSIONS OF FUNCTIONALIZED, COMPLETELY OR PARTIALLY HYDROGENATED NITRILE RUBBERS

(71) Applicant: LANXESS Deutschland GmbH, Cologne (DE)

(72) Inventors: Matthias Soddemann, Schattdorf (CH); Daniel Gordon Duff, Leverkusen (DE); Lars Krueger, Leverkusen (DE); Sigrun Stein, Leverkusen (DE)

(73) Assignee: LANXESS DEUTSCHLAND GMBH, Cologne (DE)

( * ) Notice: Subject to any disclaimer, the term of this patent is extended or adjusted under 35 U.S.C. 154(b) by 0 days.

(21) Appl. No.: 14/143,457

(22) Filed: Dec. 30, 2013

(65) Prior Publication Data
US 2014/0114011 A1    Apr. 24, 2014

Related U.S. Application Data

(62) Division of application No. 12/943,047, filed on Nov. 10, 2010, now Pat. No. 8,642,687.

(30) Foreign Application Priority Data

Nov. 19, 2009 (EP) .................................. 09176534

(51) Int. Cl.
| C08L 33/20 | (2006.01) |
|---|---|
| C08K 5/07 | (2006.01) |
| C08L 9/02 | (2006.01) |
| C08J 3/07 | (2006.01) |
| C08L 9/04 | (2006.01) |
| C09D 109/04 | (2006.01) |
| C09D 133/18 | (2006.01) |

(52) U.S. Cl.
CPC .... *C08L 9/02* (2013.01); *C08J 3/07* (2013.01); *C08L 9/04* (2013.01); *C09D 109/04* (2013.01); *C09D 133/18* (2013.01); *C08J 2309/04* (2013.01); *C08J 2313/02* (2013.01); *C08J 2315/00* (2013.01)

(58) Field of Classification Search
USPC ......... 524/510, 556, 559, 521, 113, 364, 401, 524/236, 251
See application file for complete search history.

(56) References Cited

U.S. PATENT DOCUMENTS

| 3,306,871 A | 2/1967 | Miller |
|---|---|---|
| 4,452,950 A | 6/1984 | Wideman |
| 4,826,721 A | 5/1989 | Obrecht et al. |
| 5,077,127 A | 12/1991 | Mori et al. |
| 5,122,397 A | 6/1992 | Hisaki et al. |
| 5,244,943 A | 9/1993 | Oyama et al. |
| 5,651,995 A | 7/1997 | Oyama et al. |
| 6,103,786 A | 8/2000 | Hoch et al. |
| 7,411,015 B2 * | 8/2008 | Tao et al. ...................... 524/236 |
| 2008/0271638 A1 | 11/2008 | Akiyama et al. |

FOREIGN PATENT DOCUMENTS

EP    0007042 A1    1/1980

OTHER PUBLICATIONS

Muller, H.G., "Automated determination of particle-size distributions of dispersions by analytical ultracentrifugation)", Colloid & Polymer Science, 267:1113-1116, 1989.
European Search Report from co-pending Application EP09176534 dated May 17, 2010, 2 pages.
Ullmann'S Encyclopedia of Industrial Chemistry, vol. A23, 1993, SCH Verlag, Weinheim, Germany, pp. 255-261.

* cited by examiner

*Primary Examiner* — Robert Harlan

(57) ABSTRACT

Novel stable aqueous suspensions of a functionalized, completely or partially hydrogenated nitrile rubber are provided with very low emulsifier content and small particle diameter, furtheron a process for production thereof and the use thereof for producing composite materials via coating of substrate materials with the suspension.

17 Claims, No Drawings

FINE-PARTICLE, STABLE SUSPENSIONS OF FUNCTIONALIZED, COMPLETELY OR PARTIALLY HYDROGENATED NITRILE RUBBERS

This application is a divisional of pending U.S. patent application Ser. No. 12/943,047 filed Nov. 10, 2010, with the same title, which is entitled to the right of priority of European Patent Application No. 09176534.7, filed Nov. 19, 2009, the contents of which is hereby incorporated by reference in its entirety.

FIELD OF THE INVENTION

The present invention relates to novel fine-particle, stable aqueous suspensions of a functionalized, completely or partially hydrogenated nitrile rubber, to a process for production thereof, and to use of the suspensions.

BACKGROUND OF THE INVENTION

Nitrile rubbers ("NBR") are rubbers which are co- or terpolymers of at least one $\alpha,\beta$-unsaturated nitrile, of at least one conjugated diene and, if appropriate, of one or more other copolymerizable monomers. Hydrogenated nitrile rubbers ("HNBR") are corresponding nitrile rubbers in which the C=C double bonds of the diene units incorporated into the polymer have been completely or partially selectively hydrogenated.

Both NBR and HNBR have for many years occupied a secure position in the sector of specialty elastomers. They have an excellent property profile in the form of excellent oil resistance, good heat resistance and outstanding resistance to ozone and chemicals, and this latter resistance is even higher for HNBR than for NBR. Furthermore, they have very good mechanical properties, and also good performance characteristics. They are therefore widely used in a very wide variety of application sectors, and by way of example are used for producing gaskets, hoses, drive belts and damping elements in the automobile sector, and also for stators, borehole seals and valve seals in the oil-production sector, and also for numerous components in the electrical industry, and also in mechanical engineering and shipbuilding. There is a wide variety of commercially available types, and these feature different monomers, molecular weights, polydispersities, and also mechanical and physical properties, as a function of application sector. In particular, there is increasing demand not only for the standard types but also for specialty types comprising specific termonomers or particular functionalization.

Industrial production of nitrile rubbers proceeds almost exclusively via what is known as emulsion polymerization, which is carried out in the presence of relatively large amounts of emulsifiers. After the polymerization process, the resultant NBR latex, which is a suspension of solid polymer particles in water, stabilized by the emulsifier present, is coagulated in a first step which uses salts or acids, and the solid NBR is isolated. If the intention is to proceed to hydrogenation of the NBR to give HNBR, the said hydrogenation likewise uses known prior-art methods, for example, with use of homogeneous or else heterogeneous hydrogenation catalysts based on rhodium, ruthenium or titanium or alternatively platinum, iridium, palladium, rhenium, osmium, cobalt or copper, either in the form of metal or else in the form of metal compounds. In industry, the said hydrogenation is often carried out in a homogenous phase, i.e. in an organic solvent.

The use of HNBR for producing V-belts, toothed belts and conveyor belts is known. These items are composed of a combination of a substrate material made of fibres (e.g. polyamide textile, polyester textile, glass cord, aromatic polyamide cord, etc.) and of a plurality of rubber layers. There are other rubber items having a similar structure, examples being membranes, hoses, containers, balloons and tyres. In all instances it is important to design the bond between the surface of the substrate material and the rubber in such a way that it is not the point of weakness within the composite system. Most substrate materials used nowadays, including those used in tyre production, are therefore first treated with lattices, and there is therefore increasing demand for these. A very particularly important factor here is good adhesion of the rubber to the surface of the substrate material. These latices are suspensions of the appropriate solid rubber particles in water. They are often used in binder compositions which also comprise resins/hardeners and which are known in the literature as "RFL dips" ("resorcinol-formaldehyde-latex dips") (see, for example, EP-A-0 381 457).

U.S. Pat. No. 4,452,950 describes a process for hydrogenating the carbon double bonds in a polymer which is present in the form of a latex. The hydrogenation process uses an oxidant, a reducing agent in the form of hydrazine or hydrazine hydrate and a metal ion inhibitor. By way of example, it is possible to use NBR latices which are obtained via aqueous emulsion polymerization, and it is preferable to use these without prior coagulation and without use of organic solvent (column 3, lines 8-11). These latices are therefore suspensions of the emulsifier-stabilized NBR particles in water. The hydrogenation process therefore correspondingly gives an HNBR latex. The examples show that the achievable degree of hydrogenation is at most 82%, i.e. at least 18% of the double bonds are retained. The reason for the relatively low degrees of hydrogenation is that gel content rises markedly at higher conversions. Gel particles within the latex weaken the mechanical properties of rubber products produced therefrom. Since the NBR emulsion polymerization process is carried out in the presence of emulsifiers, the resultant HNBR latex necessarily also comprises emulsifiers, with the attendant disadvantages described at a later stage below. HNBR latices produced in this way do not therefore comply with all of the requirements.

Production of latices, i.e. suspensions of solid rubber particles in an aqueous phase, also uses shear processes. Here, an organic solution of the polymer in the form of liquid organic phase is brought into contact with an aqueous phase, using a high shear rate. Emulsifiers or emulsifier mixtures with other auxiliaries are present here either in the aqueous phase only or in both phases, in order to improve the emulsifying effect. Stripping, depressurization or other distillative methods are used to remove the solvent from emulsions obtained by the said route, and the suspensions thus produced are therefore initially of relatively low concentration (another term sometimes used in the literature being "thin latex"). These suspensions are converted to the desired final concentration by way of example via further distillation, centrifuging or creaming processes. However, emulsification processes of this type are attended by high shear rates since this is the only way of obtaining fine-particle, stable emulsions (and corresponding suspensions after concentration), and their use in industry is very resource-intensive in terms of apparatus and energy. Relatively large amounts of emulsifiers are moreover required. This is disadvantageous because the latter remain in the form of a water-soluble constituent in the compounded rubber materials, but are not concomitantly vulcanized, and the result can therefore be impairment of the mechanical properties of the finished rubber component. They also lead to undesired caking of contaminants within the moulds used to produce the rubber components. Another particular disadvantage is that residues of emulsifiers can, by virtue of their surfactant properties, have an adverse effect on the adhesion of HNBR to substrate materials and in particular reinforcement fibres.

EP-A-0 240 697 describes analogous production of a highly saturated nitrile rubber latex. The highly saturated nitrile rubbers used comprise copolymers having repeat units of an α,β-unsaturated nitrile and of a conjugated diene, and corresponding terpolymers with additional repeat units of one or more copolymerizable termonomers are also used. A solution of the highly saturated nitrile rubber, the iodine number of which is not more than 120, in an inert solvent which is not water-miscible is added to emulsifier-containing water. Mechanical emulsification, i.e. emulsification achieved by introducing energy, is used to form an oil-in-water emulsion, which is therefore a liquid-liquid emulsion. The solvent is then removed from this via conventional distillation methods (stripping with steam or "steam stripping"), and the remaining aqueous phase is concentrated. The rubber molecules are then present with stabilization via emulsifier molecules in water, this being a solid-liquid system. The aqueous phase can comprise further excess amounts of emulsifier, alongside the amount of emulsifier adsorbed on the surface of the rubber particles and necessary for stabilizing the rubber particles. Centrifuging is then used to remove water from the latex, and the concentration of the said excess emulsifier present in this water is the same as in the water that remains within the latex. The centrifuging process therefore removes only that portion of the emulsifier which is not adsorbed on the surface of the rubber and is not necessary for stabilizing the rubber particles within the water. There is therefore a limit on the maximum amount of emulsifier that the centrifuging process can actually remove. If a further attempt were to be made to withdraw still further amounts of emulsifier from the latex via centrifuging or via other methods, the result would be coagulation of the rubber, therefore giving particles with average diameters far greater than 1 micrometer. This classical route given in EP-A-0 240 697 for producing latices does not permit production of fine-particle rubbers which have only very low emulsifier content but which nevertheless form stable suspensions. The description of EP-A-0 240 697 says that in order to obtain a stable latex it is necessary to use from 1 to 20 parts by weight of the emulsifier, based on 100 parts by weight of HNBR, and also to set a pH of from 8 to 13. In Example 2, emulsifier concentration is 5%, based on the rubber. The solution of the saturated nitrile rubber used for latex production can either be the solution obtained at the end of the hydrogenation process after optional further dilution, or can be a solution obtained via dissolution of solid, previously isolated HNBR in a solvent. The examples of EP-A-0 240 697 use a solvent mixture made of toluene and dichloroethane or of cyclohexane and methyl ethyl ketone. The description mentions in principle, as solvents, aromatic solvents, such as benzene, toluene and xylene, halogenated hydrocarbons, such as dichloroethane and chloroform, or ketones, such as methyl ethyl ketone and acetone, and also tetrahydrofuran (THF). According to our own investigations, however, it is not possible to use either acetone or THF for the process described in EP-A-0 240 697, since both solvents are soluble in any ratio with water, and therefore cannot per se form an emulsion, and the entire principle of the process of EP-A-0 240 697 is therefore inapplicable. The emulsifiers used comprise anionic emulsifiers, if appropriate in combination with nonionic emulsifiers. The size (i.e. the diameter) of the suspended rubber particles stabilized via appropriate amounts of emulsifier within the latex is determined by the emulsification conditions used, i.e. the amount of water and of emulsifier, and also the amount of energy introduced (e.g. in the form of agitation rate), and is stated as from 0.05 to 5 µm. It is significant that these are emulsifier-stabilized polymer particles in suspension. The HNBR contains no, or only very little, gel. The experimental description in the examples includes emulsifier-stabilized latices with about 45% solids content (rubber), with pH in the range from 9 to 9.5 and with an average particle diameter of from 0.32 to 0.61 µm, determined by an electron microscope. Another disadvantage of the said process is that particle size distribution is necessarily broad when mechanical emulsification processes are used. Furthermore, exchange of substances from the particles is inhibited by emulsifiers at the phase boundary, and this makes it more difficult to use conventional processes of concentration by evaporation or by distillation to remove solvent retained within the particles. Because of the emulsifier content, foaming is likely to occur during the concentration process, and this adds to the difficulty of achieving solvent removal under practical conditions, in particular under industrial conditions. Finally, the centrifuging step is also problematic. EP-A-0 240 697 states a requirement for 15 minutes at 3000 revolutions per minute to remove excessive emulsifier and to concentrate the latex, and this is a considerable obstacle to industrial-scale production. The fact that a centrifuge can be used to concentrate the latex necessarily also implies restricted storage stability in respect of sedimentation. As described above, it will not be possible to remove the emulsifier completely. However, emulsifier residues are disadvantageous, as described above.

The process described in EP-A-0 704 459 is in principle the same as that described in EP-A-0 240 697 for producing aqueous emulsifier-stabilized HNBR latices, the term used in the said document being "phase reversal of emulsion". Again according to EP-A-0 285 094 the production of HNBR co- or terpolymer latices is achieved by mixing an organic solution of the HNBR with an emulsifier-containing aqueous phase, thus obtaining a liquid-liquid oil-in-water emulsion, and then removing the solvent, thus obtaining an emulsifier-containing HNBR suspension in water. To obtain a stable suspension, the emulsification process must be carried out with a high level of energy introduction by means of vigorous agitation. The method of further work-up is identical with that in EP-A-0 240 697. The latices obtained have solids concentrations of about 45% by weight and pH of from 9 to 9.5. Neither EP-A-0 704 459 nor EP-A-0 285 094 provides any teaching or information about the possibility of producing fine-particle HNBR latices which have adequate stability and do not agglomerate, without use of relatively large amounts of emulsifier.

EP-A-0 252 264 also discloses the production of HNBR latices for coating substrate materials. Here, the HNBR polymer is first dissolved in an organic solvent or a solvent mixture, which either has low water-solubility and forms an azeotrope with water, with more than 50% content of the solvent, or has a boiling point below 95° C. Organic solvents mentioned are 3-chlorotoluene, diisobutyl ketone, methyl isobutyl ketone and methylisopropyl ketone. The resultant organic phase is emulsified in water by techniques known per se using anionic, cationic or nonionic emulsifiers or methylcellulose. The organic solvent is then removed via known methods, such as distillation. By way of example, this route can be used to obtain latices with up to 19% solids content and with an average particle size of 480 µm (Example 2). However, this type of particle size is much too large to justify the term "latex" in the narrower sense. The latex is therefore unsuitable as component for a dip for industrial coating of substrate materials. The said process also has the same emulsifier-content problems as the process of EP-A-0 240 697.

EP-A-0 863 173 discloses a process for producing stable, fine-particle emulsifier-stabilized polymer suspensions with polymer particle sizes of from 0.1 to 50.0 μm, particularly preferably from 0.1 to 2 μm ($d_{50}$ determined via ultracentrifuge according to J. Coll. Polym. Sci, 267 (1989), 1113). Here, a water-in-oil emulsion is first converted into an oil-in-water emulsion via exposure to shear (phase inversion). The water-in-oil emulsion used is composed of an organic phase of a water-immiscible, organic solvent, in which the polymer has been dissolved, and of an aqueous phase. If the said process is to be carried out successfully it is essential that the specific viscosity of the organic phase is in the range from 1.0 to 20 000 mPa×s (measured at 25° C.), the surface tension between organic and aqueous phase is from 0.01 to 30 mN/m, the particle size of the water emulsified in the organic phase is from 0.2 to 50 μm and the ratio by volume of organic to aqueous phase is in the range from 80:20 to 20:80. The shear must moreover be applied with a specific shear rate of from $1 \times 10^3$ to $1 \times 10^8$ watts per cm³. The list of polymers that can be used in this shear process is very varied, one option inter alia being hydrogenated nitrile rubber. Again, the use of emulsifiers is described as a requirement for this phase-inversion process, and the examples use 4.7 parts by weight for 100 parts by weight of polymer. The organic solvent is removed conventionally, e.g. via distillation, depressurization, reverse osmosis, cyclone devolatilization or spraying through a nozzle. The emphasis in EP-A-0 863 173 is on butyl rubbers and halogenated butyl rubbers. In this case, the specific shear process can produce latices with average rubber particle sizes of from 0.28 to 1.9 μm.

A disadvantage shared by the abovementioned prior-art documents is that the resultant latices comprise relatively large amounts of emulsifiers. The said emulsifiers either derive from the actual NBR emulsion polymerization process or have to be added separately during production of the latex in order to stabilize the oil-in-water emulsion which is an intermediate stage in production of the latex. Without emulsifier it is impossible to achieve a stable oil-in-water emulsion, i.e. the emulsifier is needed to achieve stability of the liquid "oil" phase (rubber in solvent). At the said juncture, the rubber is not yet present in the form of solid. Without emulsifier, the resultant droplets immediately recoalesce, and it is impossible to achieve a fine-particle suspension after a process of concentration by evaporation. The disadvantages of the presence of emulsifier have been described in detail above.

Starting from the prior art, the object of the present invention consisted in providing particularly fine-particle aqueous suspensions which are nevertheless stable and which comprise completely or partially hydrogenated nitrile rubbers with high solids concentration, where the emulsifier content thereof should be minimized. The content of double bonds should moreover be adjustable within a wide range, and a content of less than 5% should especially be achievable. The fine-particle suspension should as far as possible comprise no gel. Another object of the invention was to permit production of these suspensions by way of a process which is simple and does not require major resource in terms of apparatus.

SUMMARY OF THE INVENTION

Surprisingly, it has been found that stable, fine-particle aqueous suspensions can be obtained if specific carboxy-functionalized, completely or partially hydrogenated nitrile rubbers are precipitated from organic solution by adding an aqueous phase with pH of at least 6. In contrast to the prior art, this does not require any addition of emulsifier. The said suspensions therefore feature very low emulsifier content or indeed freedom from emulsifier.

The invention therefore provides an aqueous suspension of a carboxylated, completely or partially hydrogenated nitrile rubber which features an emulsifier content of at most 1 part by weight, based on 100 parts by weight of the carboxylated, completely or partially hydrogenated nitrile rubber, where the average particle diameter of the carboxylated, completely or partially hydrogenated nitrile rubber in the suspension is in the range from 0.01 to 0.9 micrometer, measured by means of dynamic light scattering.

DETAILED DESCRIPTION OF THE INVENTION

Dynamic light scattering is also termed photon correlation spectroscopy. It is preferable that the average particle diameter of the carboxylated, completely or partially hydrogenated nitrile rubber in the suspension according to the invention (determined via dynamic light scattering) is in the range from 0.05 to 0.8 micrometer and particularly preferably in the range from 0.08 to 0.5 micrometer.

As an alternative to the dynamic light scattering method, it is also possible to use the laser diffraction method for determining the diameter of the particles of the carboxylated, completely or partially hydrogenated nitrile rubber present in the suspension according to the invention. The particle diameter is determined here in the form of what is known as the $d_x$ value (where x is at most 100). The evaluation method here is intensity-weighted. When the particle diameter determined by way of laser diffraction and stated for a $d_x$ value is y micrometers, this means that the diameter of x % of the particles is y micrometers or smaller. In the context of this definition, the present invention encompasses a range of suspensions extending from suspensions which have a particle diameter $d_{50}$ of 0.01 micrometer (meaning that the diameter of 50% of the particles is at most 0.01 micrometer) up to suspensions which have a particle diameter $d_{50}$ of 0.9 micrometer (meaning that the diameter of 50% of the particles is at most 0.9 micrometer).

The solids concentration of the suspension according to the invention, in relation to the carboxylated, completely or partially hydrogenated nitrite rubber, is usually from 5 to 65% by weight, preferably from 20 to 60% by weight, particularly preferably from 25 to 55% by weight and in particular from 25 to 51% by weight. There is moreover in fact no gel content.

The pH of suspensions according to the invention is usually greater than or equal to 4, preferably greater than or equal to 6 and very particularly preferably greater than or equal to 8. The pH of suspensions according to the invention is moreover less than or equal to 14, preferably less than or equal to 13 and particularly preferably less than or equal to 12. The pH of the suspensions is therefore usually in the range from 4 to 14, preferably from 6 to 12, particularly preferably from 8 to 12.

The suspensions, which can also be termed "latices", preferably comprise at most 0.5 part by weight and particularly preferably less than 0.09 part by weight, of emulsifier, based on 100 parts by weight of the carboxylated, completely or partially hydrogenated nitrile rubber. They therefore feature only a very small amount of emulsifier or indeed complete absence of emulsifier. If emulsifier is still present in the suspension, subject to the abovementioned limiting value of 1 part by weight, the emulsifier derives by way of example from the production of the actual carboxylated nitrile rubber, which usually takes the form of an emulsion polymerization process, where, as a function of the work-up/purification method, certain amounts of the emulsifier proceed concomitantly through the downstream stage, i.e. the hydrogenation process, and in turn are found within the product. However, the process according to the invention is specifically superior to the prior-art processes described in that, during production of the very fine-particle, stable suspension by way of the process according to the invention, it is specifically not necessary to add any emulsifier during the precipitation process: the precipitation of the carboxylated, completely or partially hydrogenated nitrile rubber leads to the desired stable suspensions, even without addition of emulsifier. The excellent stability is discernible from the fact that the suspensions, with high solids concentration, are resistant to separation and agglomeration over a period of a number of months. The said resistance to separation can by way of example be determined by backscattering of light from the suspensions according to the invention, by using a TURBISCAN ma 2000 from Formulation SA: the decrease in the proportion of backscattered light here indicated on the long-term axis here is so small that it can be regarded as negligible. Agglomeration resistance is also determined by using photon correlation spectroscopy: It is found here that the average particle diameter does not alter even when the suspensions are subjected to prolonged storage.

The invention provides a process for producing an aqueous suspension of a carboxylated, completely or partially hydrogenated nitrile rubber, characterized in that
1) a carboxylated, completely or partially hydrogenated nitrile rubber is first dissolved in an organic solvent to form an organic phase,
2) the organic phase is then brought into contact with an aqueous phase, the pH of which is at least 6, where the water dissolves completely or partially in the organic solvent, the carboxylated, completely or partially hydrogenated nitrile rubber precipitates, and a suspension therefore forms, and
3) the organic solvent is completely or partially removed.

The process according to the invention uses one or more organic solvents. It is important that the water used in step 2) dissolves completely or partially in the solvent under the pressure and temperature conditions selected for the precipitation process. It has proven advantageous to use organic solvents in which at least 10% by weight of water, based on the total amount of solvent used, dissolve in the solvent under the conditions of the precipitation process. It is preferable to use one or more organic solvents which undergo complete mixing in any ratio with water under the selected precipitation conditions (temperature and pressure). Examples of organic solvents that can be used are acetone, methyl ethyl ketone, formic acid, acetic acid, tetrahydrofuran, dioxane, or a mixture of two or more of the said solvents. Preference is given to acetone and tetrahydrofuran.

In step 1) of the process according to the invention, the carboxylated, completely or partially hydrogenated nitrile rubber is dissolved in the organic solvent to form the "organic phase". This is typically complete dissolution. The concentration of the carboxylated, completely or partially hydrogenated nitrile rubber in the organic phase (i.e. entirety of solvent and nitrile rubber) is usually from 0.1% by weight to 30% by weight, preferably from 1% by weight to 20% by weight and particularly preferably from 2% by weight to 18% by weight.

Production of the organic phase is achieved either in that the carboxylated, completely or partially hydrogenated nitrile rubber is directly dissolved in the entire amount provided of organic solvent or else in that it is first dissolved in a relatively small amount, i.e. at a higher concentration, and then is diluted via further addition of solvent. The dissolution process takes place at a temperature in the range from 0° C. to 200° C., preferably in the range from 10° C. to the boiling point of the solvent used, at atmospheric pressure.

The resultant organic phase sometimes comprises small amounts of water and of basic substances. These can by way of example derive from the polymerization and work-up of the carboxylated nitrile rubber and can also have remained present therein through the hydrogenation process. The said small amounts of water and of basic substances can moreover also have been entrained into the organic phase by way of the solvent used, and this is true particularly when solvent is recycled. It has proven advantageous that when small amounts of water and of basic substances are present the carboxylated, completely or partially hydrogenated nitrile rubber is still soluble in the organic solvent. The residual amount of water in the solvent used for dissolution of the rubber is preferably smaller than 7% by weight and particularly preferably less than 2% by weight. If the solvent forms an azeotrope with water, and if the carboxylated, completely or partially hydrogenated nitrile rubber is soluble in the azeotrope, it is preferable, in order to facilitate the subsequent work-up of the solvent, to use an organic phase in the form of an azeotropic mixture of solvent and water, or of a mixture of solvent and water where the boiling point of the mixture differs only little (+/−2° C.) from that of the azeotropic mixture. If THF is used as solvent, a THF/water azeotrope comprises 6% by weight or less of water, as a function of the pressure at which the distillation process was carried out. If fresh solvent is used, this does not generally comprise any basic substances. If solvent recycled from previous conduct of the process according to the invention is used, there can be residual content of base present that was not removed during the separation step, at a concentration which is preferably smaller than 0.1 mol/L, and particularly preferably smaller than 0.01 mol/L. In one preferred embodiment of the process, it is also possible that all of the basic component is added to the polymer solution, and that neutral water is used for the precipitation process.

In step 2), the organic phase which comprises the carboxylated, completely or partially hydrogenated nitrile rubber in dissolved form is brought into contact with an aqueous phase, the pH of which is at least 6, where the water dissolves completely or partially in the solvent, and the carboxylated, completely or partially hydrogenated nitrile rubber precipitates and forms a suspension.

The temperature of the organic phase prior to addition of the aqueous phase is usually above 0° C. and below the boiling point of the organic solvent, at the pressure at which the precipitation process is carried out. It is preferably in the range from 10° C. to 50° C. The precipitation process can in principle be carried out at any pressure, but it is preferable to operate at atmospheric pressure.

In another preferred variant, the aqueous phase can also have been mixed with a water-vapour phase. Under the said conditions, a portion of the solvent vaporizes directly during the precipitation process, with condensation of water, thus simplifying the subsequent work-up. It is preferable that the precipitation process is then carried out in a nozzle.

An important factor for the conduct of the process according to the invention is that the pH of the aqueous phase used for the precipitation process is at least 6, preferably in the range from 7 to 14 and particularly preferably in the range from 9 to 13.

The pH of the aqueous phase is usually set via addition of one or more basic substances, preferably of sodium hydroxide, potassium hydroxide, lithium hydroxide, sodium carbonate, potassium carbonate, lithium carbonate, sodium phosphate, potassium phosphate, lithium phosphate, ammonia, primary, secondary or tertiary aliphatic or aromatic amines, and particularly preferably primary aliphatic amines having hydrocarbon moieties having from 1 to 20 carbon atoms, in particular methylamine and ethylamine, secondary aliphatic amines having hydrocarbon moieties having from 1 to 20 carbon atoms having identical or different side-chain length, in particular dimethylamine, diethylamine, dipropylamine, dibutylamine, methylethylamine, methylpropylamine, ethylpropylamine or diisopropylamine, or else of tertiary aliphatic amines having hydrocarbon moieties having from 1 to 20 carbon atoms having identical or different side-chain length, in particular tripropylamine, triethylamine, trimethylamine, dimethylethylamine or methylethylpropylamine, or derivatives of these.

Another possibility moreover is that the basic substance(s) is (are) mixed with inorganic mono-, di- or trivalent salts, e.g. sodium chloride, calcium chloride or aluminium chloride in concentrations below the critical coagulation concentration of the latex. It is preferable that the concentration of salts of this type in the aqueous phase is lower than 0.1 mol/L. It is also possible to add acids, e.g. inorganic acids, preferably hydrochloric acid, sulphuric acid, phosphoric acid or nitric acid, or organic acids, preferably formic acid, acetic acid or propionic acid, or else salts thereof, in order to achieve the desired pH.

The person skilled in the art is aware of the rules of acid-base equilibrium which are necessary for setting a pH within the range stated above. In the case of the preferred use of amines, it is advisable to use a concentration of from 0.0001 mol/l to 5.6 mol/l of the base in the aqueous phase, preferably from 0.001 to 1.2 mol/l and particularly preferably from 0.01 to 0.5 mol/l.

The quality of the water used can be that which is generally available, or water with relatively low contents of ions can be used; it is preferable to use water with low content of ions, and particular preference is given to deionized water.

In an alternative embodiment, the procedure in the process according to the invention can also be that the aqueous phase which is used and with which the organic phase is brought into contact in step 2) does not have the abovementioned basic pH, but instead has a pH of at least 3, preferably from 4 to 8, particularly preferably from 5 to 8, to the extent that the organic phase comprises an amount of base sufficient to give a pH in the range from at least 6, preferably 7 to 14 and particularly preferably from 9 to 13 when the organic and inorganic phase are brought into contact in step 2). The amounts of base in the organic phase can, as described at an earlier stage above, derive from the polymerization and work-up of the carboxylated nitrile rubber, or from the use of recycled solvent. In this alternative embodiment there is then no requirement for separate addition of a base to the aqueous phase.

The dissolution of the carboxylated, completely or partially hydrogenated nitrile rubber can take place in conventional vessels or reactors. One preferred variant is provided by stirred containers equipped with stirrer units which are conventional and known to the person skilled in the art, examples being blade stirrers, including cross-blade stirrers and oblique/blade stirrers, propeller stirrers, gate stirrers and impeller stirrers. The stirred containers can have baffles.

The said organic phase is then brought into contact with the aqueous phase, and the carboxylated, completely or partially hydrogenated nitrile rubber precipitates, and the suspension according to the invention forms.

During this precipitation process, the nitrile rubber is separated out of the organic phase via addition of precipitate, in this case water at the stated pH, in the form of completely or partially insoluble solid. Various process-technology variants can be used here. One preferred variant of the precipitation process consists in running the aqueous phase into a stirred container which comprises the organic solution of the carboxylated, completely or partially hydrogenated nitrile rubber. The addition is preferably carried out in a minimum time of less than 100 seconds, particularly preferably less than 30 seconds, by way of a tip feed. The stirred container has conventional stirrer units known to the person skilled in the art. Preference is given to multistage stirrers, examples being multistage oblique-blade stirrers or multistage MIG stirrers. The power consumption in the stirred container is preferably from 3 to 0.001 W/l, particularly preferably from 0.3 to 0.01 W/l. The stirred containers usually have not only the stirrer unit but also baffles. The time needed for the precipitation process is the total of the addition time and the mixing time. The mixing time for an industrially operated stirred tank is, as the person skilled in the art is aware, typically low, being in the region of 100 seconds or less. The specific energy consumption, based on volume, is calculated from the time required for the precipitation process multiplied by the power consumption. The energy consumption for the precipitation process is therefore preferably smaller than $6*10^5$ J/m$^3$ and particularly preferably smaller than $3.3*10^4$ J/m$^3$ as can be calculated from the numerical data above.

In another preferred variant of the precipitation process, the organic phase is brought into contact continuously with the aqueous phase. Particular preference is given here to the use of a mixing nozzle, and another preferred variant operates with a static mixer. In another preferred variant, a mixing nozzle and a static mixer are connected in series. Mixing nozzles and static mixers are known to the person skilled in the art and can be designed in accordance with the prior art. The pressure losses in the mixing nozzles and static mixers are preferably smaller than 10 bar, particularly preferably smaller than 1 bar and very particularly preferably smaller than 100 mbar. The specific energy consumption based on volume can, as is known to the person skilled in the art, be calculated directly from the pressure loss and is therefore preferably smaller than $10^6$ J/m$^3$, particularly preferably smaller than $10^5$ J/m$^3$ and very particularly preferably smaller than $10^4$ J/m$^3$. It is also possible to use other mixing apparatuses known from the prior art. By way of example, these can be continuously operated stirred tanks or rotor-stator systems. In the case of continuously operated stirred tanks for the precipitation process, the feed of both components can by way of example be continuous or pulsed.

In principle, preference must be given to industrial processes with low energy consumptions, since they save energy and require apparatuses that are less complicated and expensive.

The ratio by mass of the organic solution which comprises the carboxylated, completely or partially hydrogenated nitrile rubber to the aqueous phase is usually from 50:1 to 1:1, preferably from 30:1 to 3:1 and particularly preferably from 15:1 to 4:1.

In individual instances of the precipitation process in step 2) it is possible that, as a function of the precipitation conditions, a small portion of the carboxylated, completely or partially hydrogenated nitrile rubber is produced in the form of relatively coarse particles with particle diameters of more than 5 micrometers. However, this fraction of coarse-grain particles is usually at most 2%, based on the total amount of precipitated particles, and is also often markedly lower than that. It is advisable to remove the said coarse-grain fraction via sedimentation, decanting or filtration. It can be redissolved and returned to the precipitation process in step 1).

In the next step, the organic solvent is completely or partially removed from the suspension obtained in step 2). It has proven advantageous that the fine-particle suspension according to the invention that is present after step 3) retains at most 0.5% by weight, preferably at most 0.1% by weight, of solvent, based on the entire suspension.

In order to set a desired concentration, either simultaneously or after the solvent-removal process, it is optionally possible, in a further step, to remove a certain portion of the water, or else to remove the basic substance(s), completely or to some extent.

After step 3), the rubber is present in the form of fine-particle suspension with an average particle diameter in the range from 0.05 to 0.9 micrometer, determined via dynamic light scattering. To the extent that prior removal of coarse-grain fractions has been undertaken, the determination of average particle diameter is delayed until after the said coarse-grain fractions have been removed. It has proven advantageous to remove coarse-grain particles with a diameter of at least 5 micrometers.

In an example of a method for the removal of the solvent, and also for the optional further concentration process, the suspension obtained via the precipitation process can be concentrated by evaporation. For this, it is preferable that the suspension is exposed to elevated temperatures and/or to reduced pressure. The temperature is preferably in the range from 30 to 100° C., and the pressure is preferably in the range from 20 to 1000 mbar (absolute). The concentration-by-evaporation process takes place in devices known to the person skilled in the art, an example being a stirred container, a falling-film evaporator, a circulating evaporator or a distillation column. Preference is given to a stirred tank. Any adhesion of the suspension to given surfaces of the devices and to pipelines can be minimized via suitable coatings with low surface energy, an example being fluoropolymers, such as PTFE or PVDF.

One preferred concentration method via evaporation in a stirred tank has various variants, termed "batch", "fed batch" and "conti" below.

In the "batch" variant, the suspension serves as initial charge in the stirred tank at the start of the concentration-by-evaporation process, and this process proceeds with stepwise or continuous lowering of the pressure and/or stepwise or continuous raising of the temperature, until the desired concentration of water and residual solvent has been reached. If the precipitation process has been carried out in a stirred container, the concentration-by-evaporation process can advantageously be carried out in the same stirred container. Since the amount of suspension is very small in relation to the starting materials in this variant, it can be advantageous to terminate the concentration-by-evaporation process when from 50 to 90% of the total volume in the stirred container has been evaporated, and to continue this process in another stirred container. It can sometimes also be advisable to combine suspensions from various batches and to continue the concentration-by-evaporation process in the same or another stirred container.

In the "fed batch" variant, suspension from the precipitation process is first charged to the stirred container, and the concentration-by-evaporation process is begun. Fresh suspension from the precipitation process is introduced, the amount of this being the same as the amount of solvent and water removed by evaporation, and the fill level in the stirred container therefore remains approximately the same. Towards the end, introduction of fresh suspension from the precipitation process is terminated and the remaining part of the concentration-by-evaporation process is undertaken. The suspension here can be introduced either from a continuous precipitation process or, for example, from a batchwise precipitation process in a stirred tank.

In one preferred embodiment of the "batch" or "conti" variants, a stream of the container contents is removed from the container, heated by way of a heat exchanger, and in turn returned to the container, in order to achieve better introduction of heat and thus shorten the time required for the concentration-by-evaporation process.

In another preferred embodiment of the "batch" or "conti" variants, a stream of the container contents is likewise removed from the container, and then a heat exchanger operated with two phases, e.g. a falling-film evaporator, a helical tube operated with a plurality of phases, a tube-bundle heat exchanger operated with a plurality of phases, or a thin-film evaporator is used to introduce energy into the said stream in the form of heat or, in the case of the thin-film evaporator, in the form of heat and mechanical energy, and a portion of the solvent is also removed in gaseous form via evaporation.

In the "conti" variant, a stream of suspension that is in essence continuous is introduced into a stirred container. "In essence continuous" means that the stream can also be interrupted for a certain time. Solvent and water are constantly removed via evaporation. A discharge stream is removed from the stirred container, and the fill level of the container does not therefore undergo any further change once any filling procedures have been concluded. As a function of pressure and temperature in the tank used for the concentration-by-evaporation process, the suspension obtained from this process retains certain amounts of solvent, and it is therefore advantageous that this is followed by a "fed batch" or "batch" concentration-by-evaporation process.

A concentration-by-evaporation process which has proven advantageous, for reasons of stability of the suspension, is one where the pH of the suspension is held within the range from 6 to 13, particularly preferably from 8 to 13, through the entire process. As a function of the base used, it can be advisable to add bases or acids to the suspension prior to, during and/or after the concentration-by-evaporation process, in order to maintain the required pH. Bases that can be used are by way of example amines identical with those mentioned above for preparing the aqueous phase, and preferably sodium hydroxide, potassium hydroxide, lithium hydroxide, sodium carbonate, potassium carbonate, lithium carbonate, sodium phosphate, potassium phosphate and lithium phosphate. Acids that can be used are by way of example hydrochloric acid, acetic acid, formic acid, sulphuric acid or phosphoric acid. Preference is given to hydrochloric acid.

In another preferred concentration method, a polymeric binder, for example alginate, is added to the suspension, and separation is then undertaken via centrifuging or sedimentation under gravity, with subsequent redispersion in the form of concentrate.

Another preferred concentration method encompasses extraction via addition of an extractant to the suspension after the precipitation process. The said extractant should preferably comply with the following conditions: (i) be immiscible with water, (ii) be soluble in the solvent and (iii) not be a solvent for the rubber, (iv) have a sufficient density difference with respect to water, and also particularly preferably should comply with the following further conditions: (v) have a vapour pressure higher than that of the solvent and (vi) if at all possible not form an azeotrope with the solvent. Preferred extractants are linear, cyclic or branched alkanes having at least 6 carbon atoms and preferably having at least 10 carbon atoms. Hexadecane is particularly preferred. The contact between the precipitated polymer particles and the extractant preferably takes place in a mixing unit known to the person skilled in the art, e.g. in a stirred container. The result is that a large portion of the solvent transfers to the extractant phase, while the suspension of the carboxylated nitrile rubber remains in the residual water phase. Phase separation is then carried out in known apparatuses, e.g. settlers, which can have internals to improve settling of the droplets, or centrifuges.

The suspension according to the invention is concentrated until the desired concentration of solids has been reached. The concentration of solids in the suspension according to the invention is usually 10 to 65% by weight, preferably from 20 to 60% by weight, particularly preferably from 25 to 55% by weight and in particular from 25 to 51% by weight.

The process of concentration via evaporation and/or extraction gives not only the suspension according to the invention but the solvent removed from the precipitation process, and sometimes other solvent from any extraction process that may have been used, and the separated water, and also sometimes volatile bases. In order to increase the cost-effectiveness of the process according to the invention, it has proven advantageous to separate the said substances from one another and to recycle them. The separation process preferably takes place in one or more distillation columns, and these can be operated batchwise or continuously. These distillation columns are known to the person skilled in the art and can be designed in accordance with the prior art. The solvent from the precipitation process in step 2), and also the solvent that may have been used for the extraction process, are reintroduced into the process in the form of solvent for the rubber and, respectively, in the form of extractant. If the organic solvent forms an azeotrope with water, or if an azeotrope forms in any ternary mixture that may arise comprising water, solvent and extractant, the methods known to the person skilled in the art for the separation of azeotropes must be used, an example being distillation at two different pressure levels.

If, as is preferred, amines are used as basic substances, it is sometimes advisable then to carry out a further separation stage to separate the amines from the solvent. This can likewise take place in a distillation column. The said distillation column can have been combined with the other distillation column for separating water and solvent, to give a single column, e.g. in a partitioned column. It is also possible to use an acid functionality to remove the amine from the vapour stream or from the solvent. By way of example, this can be achieved via a wash with acidic liquid (for example sulphuric acid) or via an ion exchanger, or via precipitation using an acidic compound.

If bases are used which have a boiling point lower than that of water, and which are not present in completely dissociated form, it is then possible to displace the said bases by using stronger bases, e.g. sodium hydroxide solution, preferably during the concentration process, and thus to achieve base exchange.

Carboxylated Completely or Partially Hydrogenated Nitrile Rubbers:

The carboxylated, completely or partially hydrogenated nitrile rubbers present in the aqueous suspension are rubbers having repeating units derived from at least one conjugated diene, from at least one α,β-unsaturated nitrile and from at least one further carboxylated, copolymerizable termonomer, where at least 50%, preferably at least 80%, particularly preferably from 80 to 100% and in particular from 90 to 100%, of the C═C double bonds of the diene monomer incorporated into the polymer have been hydrogenated.

The conjugated diene can be of any type. Preference is given to use of ($C_4$-$C_6$) conjugated dienes. Particular preference is given to 1,3-butadiene, isoprene, 2,3-dimethylbutadiene, piperylene or a mixture thereof. Particular preference is given to 1,3-butadiene and isoprene or a mixture thereof. Very particular preference is given to 1,3-butadiene.

The α,β-unsaturated nitrile used can comprise any known α,β-unsaturated nitrile, preference being given to ($C_3$-$C_5$)-α,β-unsaturated nitriles such as acrylonitrile, methacrylonitrile, ethacrylonitrile or a mixture thereof. Particular preference is given to acrylonitrile.

"Carboxy-containing termonomers" means monomers which either comprise at least one carboxy group within the monomer molecule or which can react in situ with release of at least one carboxy group.

Carboxyl-containing, copolymerizable termonomers that can be used comprise by way of example α,β-unsaturated monocarboxylic acids, their esters or amides, α,β-unsaturated dicarboxylic acids, their mono- or diesters or the corresponding anhydrides or amides.

Preference is further given to aqueous suspensions of a carboxylated, completely or partially hydrogenated nitrile rubber which comprises repeat units of at least one ($C_4$-$C_6$) conjugated diene, preferably 1,3-butadiene, isoprene, 2,3-dimethylbutadiene, piperylene or a mixture thereof, of at least one ($C_3$-$C_5$)-α,β-unsaturated nitrile, preferably acrylonitrile, methacrylonitrile, ethacrylonitrile or a mixture thereof, and of at least one other carboxylated, copolymerizable monomer selected from the group consisting of α,β-unsaturated monocarboxylic acids, their esters, their amides, α,β-unsaturated dicarboxylic acids, their mono- or diesters, or their corresponding anhydrides or amides.

Preferred α,β-unsaturated monocarboxylic acids that can be used are acrylic acid and methacrylic acid. It is also possible to use esters of the α,β-unsaturated monocarboxylic acids, preferably their alkyl esters and alkoxyalkyl esters. Preference is given to the alkyl esters, in particular $C_1$-$C_{18}$ alkyl esters of the α,β-unsaturated monocarboxylic acids, particular preference is given to alkyl esters, in particular $C_1$-$C_{18}$ alkyl esters of acrylic acid or of methacrylic acid, in particular methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylate, butyl methacrylate and 2-ethylhexyl methacrylate. Preference is also given to alkoxyalkyl esters of the α,β-unsaturated monocarboxylic acids, and particular preference is given to alkoxyalkyl esters of acrylic acid or of methacrylic acid, in particular $C_2$-$C_{12}$-alkoxyalkyl esters of acrylic acid or of methacrylic acid, and very particularly preferably methoxymethyl acrylate, methoxyethyl(meth)acrylate, ethoxyethyl(meth)acrylate and methoxyethyl(meth)acrylate. It is also possible to use a mixture of alkyl esters, e.g. of those mentioned above, with alkoxyalkyl esters, e.g. in the form of those mentioned above. It is also possible to use cyanoalkyl acrylates and cyanoalkyl methacrylates, having from 2 to 12 carbon atoms in the cyanoalkyl group, preferably α-cyanoethyl acrylate, β-cyanoethyl acrylate and cyanobutyl methacrylate. It is also possible to use hydroxyalkyl acrylates and hydroxyalkyl methacrylate, where the C atom number of the hydroxyalkyl groups is from 1 to 12, preferably 2-hydroxyethyl acrylate, 2-hydroxyethyl methacrylate and 3-hydroxypropyl acrylate. It is also possible to use fluorine-substituted benzyl-containing acrylates or methacrylates, preferably fluorobenzyl acrylate, and fluorobenzyl methacrylate. It is also possible to use fluoroalkyl-containing acrylates and methacrylates, preferably trifluoroethyl acrylate and tetrafluoropropyl methacrylate. It is also possible to use amino-containing α,β- unsaturated carboxylic esters, such as dimethylaminomethyl acrylate and diethylaminoethyl acrylate.

Other copolymerizable monomers that can be used are α,β-unsaturated dicarboxylic acids, preferably maleic acid, fumaric acid, itaconic acid, citraconic acid and mesaconic acid, or α,β-unsaturated dicarboxylic anhydrides, preferably maleic anhydride, fumaric anhydride, itaconic anhydride, citraconic anhydride and mesaconic anhydride.

It is also possible to use mono- or diesters of α,β-unsaturated dicarboxylic acids, e.g. in the form of the alkyl, preferably $C_1$-$C_{10}$-alkyl, in particular ethyl, n-propyl, isopropyl, n-butyl, tert-butyl, n-pentyl or n-hexyl, cycloalkyl, preferably $C_5$-$C_{12}$-cycloalkyl, particularly preferably $C_6$-$C_{12}$-cycloalkyl, alkylcycloalkyl, preferably $C_6$-$C_{12}$-alkylcycloalkyl, particularly preferably $C_7$-$C_{10}$-alkylcycloalkyl, aryl, preferably $C_6$-$C_{14}$-aryl, mono- or diesters and in the case of the diesters these can also be mixed esters.

Examples of α,β-unsaturated dicarboxylic monoesters encompass monoalkyl esters of maleic acid, preferably monomethyl maleate, monoethyl maleate, monopropyl maleate and mono-n-butyl maleate;

monocycloalkyl esters of maleic acid, preferably monocyclopentyl maleate, monocyclohexyl maleate and monocycloheptyl maleate;

monoalkylcycloalkyl esters of maleic acid, preferably monomethylcyclopentyl maleate and monoethylcyclohexyl maleate;

monoaryl esters of maleic acid, preferably monophenyl maleate;

monobenzyl esters of maleic acid, preferably monobenzyl maleate;

monoalkyl esters of fumaric acid, preferably monomethyl fumarate, monoethyl fumarate, monopropyl fumarate and mono-n-butyl fumarate;

monocycloalkyl esters of fumaric acid, preferably monocyclopentyl fumarate, monocyclohexyl fumarate and monocycloheptyl fumarate;

monoalkylcycloalkyl esters of fumaric acid, preferably monomethylcyclopentyl fumarate and monoethylcyclohexyl fumarate;

monoaryl esters of fumaric acid, preferably monophenyl fumarate;

monobenzyl esters of fumaric acid, preferably monobenzyl fumarate;

monoalkyl esters of citraconic acid, preferably monomethyl citraconate, monoethyl citraconate, monopropyl citraconate and mono-n-butyl citraconate;

monocycloalkyl esters of citraconic acid, preferably monocyclopentyl citraconate, monocyclohexyl citraconate and monocycloheptyl citraconate;

monoalkylcycloalkyl esters of citraconic acid, preferably monomethylcyclopentyl citraconate and monoethylcyclohexyl citraconate;

monoaryl esters of citraconic acid, preferably monophenyl citraconate;

monobenzyl esters of citraconic acid, preferably monobenzyl citraconate;

monoalkyl esters of itaconic acid, preferably monomethyl itaconate, monoethyl itaconate, monopropyl itaconate and mono-n-butyl itaconate;

monocycloalkyl esters of itaconic acid, preferably monocyclopentyl itaconate, monocyclohexyl itaconate and monocycloheptyl itaconate;

monoalkylcycloalkyl esters of itaconic acid, preferably monomethylcyclopentyl itaconate and monoethylcyclohexyl itaconate;

monoaryl esters of itaconic acid, preferably monophenyl itaconate;

monobenzyl esters of itaconic acid, preferably monobenzyl itaconate;

monoalkyl esters of mesaconic acid, preferably the monoethyl ester of mesaconic acid.

The α,β-unsaturated dicarboxylic diesters used can comprise the analogous diesters based on the abovementioned groups of monoesters; there can also be chemical differences within the ester groups here.

The proportions of conjugated diene and of α,β-unsaturated nitrile in the carboxylated, partially or completely hydrogenated nitrile rubbers to be used can vary widely. The proportion of the, or of the entirety of the, conjugated diene(s) is usually in the range from 40 to 90% by weight, preferably in the range from 60 to 85% by weight, based on the entire polymer, and the proportion of the, or of the entirety of the, α,β-unsaturated nitrile(s) is usually from 9.9 to 59.9% by weight, preferably from 14 to 40% by weight, based on the entire polymer, and the proportion of the carboxylated monomer is in the range from 0.1 to 30% by weight, particularly preferably from 1 to 20% by weight, based on the entire polymer, where the proportions of all three of the monomers must always give a total of 100% by weight.

The Mooney viscosities (ML (1+4 at 100° C.)) of the carboxylated, completely or partially hydrogenated nitrile rubbers are from 1 to 160 Mooney units, preferably from 15 to 150 Mooney units, particularly preferably from 20 to 150 Mooney units and in particular from 25 to 145 Mooney units. The Mooney viscosity (ML (1+4 at 100° C.)) is determined by means of a shearing-disc viscometer to DIN 53523/3 or ASTM D1646, at 100° C.

The polydispersity PDI=Mw/Mn of the carboxylated, completely or partially hydrogenated nitrile rubbers used, where Mw is the weight-average molecular weight and Mn is number-average molecular weight, is typically in the range from 2.0 to 6.0 and preferably in the range from 2.0 to 5.0.

The materials can be synthesized by methods known to the person skilled in the art, i.e. usually by way of emulsion polymerization of the appropriate abovementioned monomers to give the carboxylated nitrile rubber and subsequent hydrogenation with homogeneous or else heterogeneous catalysis in organic solution, e.g. in chlorobenzene or acetone.

Carboxylated, completely or partially hydrogenated nitrile rubbers are also available commercially, e.g. with trade mark Therban® XT VP KA 8889 from Lanxess Deutschland GmbH.

Within the present application, the "emulsifier", the amount of which present in the suspension according to the invention is at most 1 part by weight, based on 100 parts by weight of the carboxylated, completely or partially hydrogenated nitrile rubber, is an anionic, cationic or nonionic emulsifier conventionally used for stabilizing oil-in-water emulsions. This effect is based on a reduction in the surface tension between an organic polymer phase and an aqueous phase, caused by the emulsifier. The definition of the emulsifier in particular covers emulsifiers which cause the value of the surface tension between an organic and an aqueous phase to be less than 10 mN/m, preferably less than 1 mN/m.

By way of example, the definition covers aliphatic and/or aromatic hydrocarbons having from 8 to 30 carbon atoms which have a hydrophilic terminal group, preferably a sulphonate terminal group, sulphate terminal group, carboxylate terminal group, phosphate terminal group or ammonium terminal group. The definition also covers nonionic surfactants having functional groups, examples being polyalcohols, polyethers and/or polyesters. The definition also covers fatty acid salts, such as the sodium and/or potassium salts of oleic acid, the corresponding salts of alkylarylsulphonic acids and of naphthylsulphonic acid, and also covers condensates thereof, e.g. with formaldehyde, and also covers the corresponding salts of alkylsuccinic acid and of alkylsulphosuccinic acid.

The invention further provides a process for the coating of substrate materials, preferably of plastics, metals or fibres, particularly preferably glass fibres, metal fibres or synthetic organic fibres, in particular fibres made of polyesters, and aliphatic and/or aromatic polyamides, or polyvinyl alcohol, by bringing the aqueous suspension according to the invention into contact with the substrate material.

Each of the abovementioned fibres can be used in the form of staple fibres, filaments, cords or ropes.

The invention therefore further provides a binder composition comprising
a) aqueous suspension according to the invention, and also
b) a mixture comprising resin and/or hardener, preferably resorcinol/formaldehyde, resorcinol/chlorophenol/formaldehyde, isocyanates, capped isocyanates, urea derivatives or a mixture thereof and
c) optionally one or more other rubber additives, preferably crosslinking agents, crosslinking accelerators and fillers, in particular carbon black or mineral filler.

A binder composition particularly preferably used for coating the abovementioned substrate materials comprises a) the suspension according to the invention, and also b) a resorcinol-formaldehyde mixture.

The ratio by weight of resorcinol to formaldehyde in the mixture b) is preferably 1:(from 0.5 to 3), preferably 1:(from 1 to 2). Resorcinol-chlorophenol-formaldehyde mixtures (e.g. 2,6-bis(2,4-dihydroxyphenylmethyl)-4-chlorophenol-formaldehyde mixtures) have also proven advantageous as mixture b).

The resorcinol-formaldehyde mixture b) can have a content of from 10 to 180 parts by weight (dry), based on 100 parts by weight of the carboxylated, completely or partially hydrogenated nitrile rubber present in the latex.

When glass fibres are used, the ratio by weight of a resorcinol-formaldehyde mixture b) to the HXNBR latex (dry) should be 1:(from 5 to 15), preferably 1:(from 8 to 13), and in the case of synthetic organic fibres 1: (from 3 to 10), preferably 1:(from 5 to 8).

The binder composition can also comprise, alongside the suspension a) according to the invention and the mixture b), one or more further latices d), as long as this does not disadvantageously alter the fundamental properties during coating of the substrate material. Examples of suitable materials are latices based on styrene-butadiene copolymers and modifications of these, or on acrylonitrile-butadiene co- or terpolymers and modifications of these, natural rubber latex and modifications thereof, vinylpyrrolidone (VP) latex and modifications thereof, chlorosuiphone rubber (CSM) latex and modifications thereof, and chloroprene (CR) latex and modifications thereof.

The amount of the binder composition used for coating the substrate material, in particular fibres, is usually in the range from 10 to 25% by weight, preferably in the range from 15 to 20% by weight for glass fibres, or else preferably from 3 to 10% by weight and particularly preferably from 5 to 8% by weight for synthetic organic fibres.

Once the binder composition has been applied to a fibre or textile, the wetted fibres/textiles are typically dried at from 120 to 350° C., preferably from 200 to 300° C. in the case of glass fibres, or else at from 140 to 250° C. in the case of synthetic organic fibres.

A feature of the said binder compositions based on the suspensions according to the invention, when these are used, is that they are excellent adhesion promoters for the other rubbers into which the coated substrate materials are embedded. For some fibres, it is possible to achieve a further improvement in bonding properties by wetting the fibres with solutions made of isocyanates or epoxides or a mixture thereof, prior to application of the binder compositions. The fibres are then dried before they are wetted as described with the binder composition. The drying temperature is then slightly lower than in the case described above.

The invention further provides the coated substrate material which is obtainable by way of the abovementioned coating process.

The invention further provides a process for producing composite materials which is characterized in that the coated substrate material is embedded and vulcanized into a mixture of one or more other rubbers and auxiliaries, where the rubbers have preferably been selected from the group consisting of NR, BR, SBR, EPM, EPDM, ECO, EVM, CSM, ACM, VMQ, FKM, NBR, HNBR and mixtures and the auxiliaries are preferably fillers, crosslinking agents and crosslinking accelerators.

Fillers, crosslinking agents and crosslinking accelerators that can be used are any of those known to the person skilled in the art, and by way of example the crosslinking agents used can comprise peroxidically crosslinking systems or systems based on sulphur and/or based on thiuram. Suitable additives are particularly those which provide further improved bonding of the rubbers to the substrate material described equipped with the suspension according to the invention, in particular a substrate material in the form of fibres.

Suitable vulcanization conditions for producing the composite materials are well known to the person skilled in the art.

The composite materials have various fields of application, preferably in the form of reinforced items of any type, and particularly preferably in the form of fibre-reinforced items of any type, in particular in the form of drive belts of any type, membranes, bellows, air springs, rubber muscles and hoses.

EXAMPLES

The examples below used:

| Carboxylated hydrogenated nitrile rubber | Acrylonitrile content (% by wt.) | Butadiene content (% by wt.) | RDB* | Mooney-viscosity (ML 1 + 4 at 100° C.) |
|---|---|---|---|---|
| Therban ®XT VP KA 8889 (hydrogenated terpolymer of acrylonitrile/butadiene/methacrylic acid) (also referred to as "HXNBR-1" below) | 33 | 62 | 3.5 | 77 |
| HXNBR-2 (hydrogenated terpolymer of acrylonitrile/butadiene/monoethyl ester of maleic acid) | 34 | 61 | <0.9 | 83 |
| HXNBR-3 (hydrogenated terpolymer of acrylonitrile/butadiene/monoethyl ester of maleic acid) | 43 | 52 | <0.9 | 106 |

-continued

| Carboxylated hydrogenated nitrile rubber | Acrylonitrile content (% by wt.) | Butadiene content (% by wt.) | RDB* | Mooney-viscosity (ML 1 + 4 at 100° C.) |
|---|---|---|---|---|
| Therban ® A 3407 (hydrogenated copolymer of acrylonitrile/butadiene) | 34 | 66 | <0.9 | 70 |

*RDB: Residual double bond content
Corax ® N550 N550 carbon black, Evonik - Degussa GmbH
Luvomaxx ® CDPA 4,4-Bis(1,1-dimethylbenzyl)diphenylamine, Lehmann & Voss & Co.
Maglite ® DE Magnesium Oxide, Lehmann & Voss & Co.
Penacolite R50 Resorcinol-formaldehyde solution, 50% in water, Castle Chemicals Ltd
Perkadox ® 14-40 Di(tert-butylperoxyisopropyl)benzene supported on silica, 40% active, Akzo Nobel Chemicals GmbH
TAIC Triallyl isocyanurate, Kettlitz Chemie GmbH & Co.
Therban ® ART VP KA 8796: Masterbatch made of Therban ® 3467 (HNBR having 34% by weight of acrylonitrile and 66% by weight of butadiene) and zinc diacrylate, LANXESS Deutschland GmbH
Vulkasil A1 Silica, LANXESS Deutschland GmbH
Vulkanox ® ZMB2 Methyl-2-mercaptobenzimidazole zinc salt, LANXESS Deutschland GmbH
Zinkoxid Aktiv Zinc oxide, LANXESS Deutschland GmbH Examples 1-8

Precipitation of HXNBR-1 from Acetonic Solution

The latices were produced as follows. The process parameters specifically selected here are stated in Table 1. The experiments were carried out at room temperature and atmospheric pressure. Room temperature means 22+/−2° C.

An acetonic solution (10 g) having the content stated in Table 1 of completely dissolved HXNBR-1 served as initial charge in a beaded-rim bottle of capacity 50 ml. Water which had been adjusted to the Ph mentioned in Table 1 by using the base likewise stated in Table 1 was then added as quickly as possible by means of syringe, while the mixture was stirred at maximum speed with a magnetic stirrer. The resultant suspension was then freed from the acetone solvent by means of a rotary evaporator, and small amounts of coarse particles were removed by decanting. The remaining HXNBR-1 suspension was used firstly for measurement of the average particle size of the HXNBR-1 particles via dynamic light scattering using ZetaSizer 3000 HS from Malvern and secondly for determination of solids content by means of a Moisture Analyzer LJ 16 moisture balance from Mettler. The yield stated in Table 1 is the proportion of HXNBR-1 found on the moisture balance. Values slightly above 100% result from the weighing tolerances of the method. "n.d." means that the yield was not determined.

Example 9

Precipitation of HXNBR-1 from Acetonic Solution

An acetonic solution (6400 g) with 2.5% by weight of HXNBR-1 was placed in a stirred container of capacity of 10 L, equipped with a three-stage stirrer. Water (640 g) that had been previously adjusted to pH 12.3 by using diethylamine was added to the HXNBR-1 solution over a period of six seconds, with stirring. The pressure within the container was then lowered to 250 mbar, and water and acetone were removed by distillation at pressures of from 200 to 300 mbar. For this, the wall temperature was increased to 35° C.; it was increased to 45° C. after the experiment had run for 3 hours and 6 minutes, when the container contents were 4.7 liters, and it was increased to 50° C. after the experiment had run for 5 hours and 33 minutes, when the contents of the container were 1.6 liters. When the experiment had run for 6 hours 39 minutes and the contents of the container were 0.9 liter, the pressure was lowered to 100 mbar. After the experiment had run for 7 hours and 1 minute, 545.8 g of latex were discharged from the stirred container. A few coarse-grain particles had settled on the base of the stirred container, and were discarded. The amount of the said coarse-grain particles was negligible and was therefore not determined. The average particle diameter was 229 nanometers, measured by means of dynamic light scattering, using Zeta Plus measurement equipment from Brookhaven Instruments Corporation. The pH of the latex was 9.8.

The resultant latex was placed in a stirred container of capacity one liter and subjected to further distillation at a pressure of 100 mbar and a wall temperature of 50° C. pH was monitored every two hours and maintained within the range above 9 via addition of a total of 141 mL of 0.1 molar NaOH. Addition of the sodium hydroxide solution resulted in base exchange. The intermediate sample removed had pH 9.2 and solids concentration 44.5%.

The product was an HXNBR-1 latex, stabilized by sodium hydroxide solution and having 50.7% solids content and pH 9.35 and particle diameter 241 nm, measured by dynamic light scattering.

Example 10

Precipitation of HXNBR-1 from Acetonic Solution

A solution of 14.8 kg of HXNBR-1 in 150 kg of acetone was produced at room temperature in an inertized stirred container A. The said solution (48 kg) and a further 112 kg of

TABLE 1

| Example | Concentration of HNXBR-1, based on total weight of solution [% by wt.] | Mass of water phase [g] | Base | pH of water phase | Yield [%] | Average particle diameter determined via dyn. light scattering [nm] |
|---|---|---|---|---|---|---|
| 1 | 2 | 10 | Sodium hydroxide solution | 12 | 99.9 | 205 |
| 2 | 1 | 10 | — | 7 | n.d. | 161 |
| 3 | 2 | 1 | Ammonia | 12 | n.d. | 94 |
| 4 | 2 | 1 | Methylamine | 12 | 100.6 | 132 |
| 5 | 2 | 1 | Dimethylamine | 12 | 97.9 | 158 |
| 6 | 2 | 1 | Ethylamine | 12 | 99.4 | 152 |
| 7 | 2 | 1 | Diethylamine | 12 | 100.6 | 163 |
| 8 | 3 | 10 | Methylamine | 13 | 92.7 | 109 | acetone were placed in another inertized stirred container B, which was equipped with a multistage stirrer, and were preheated to 25° C.

In another container C, 16 kg of deionized water were mixed with 150 g of diethylamine. The said mixture of water and diethylamine was added within a period of 22 seconds to the acetonic solution of the HXNBR-1 in stirred container B, with stirring, and stirring was continued for a further 5 minutes, with precipitation of the HXNBR-1.

The wall temperature of the tank B was then increased from 25° C. to 35° C., and after one hour to 45° C. At the same time, the pressure was lowered to values of from 300 to 400 mbar, and water and acetone were removed by distillation, with stirring. After 4 hours, the remaining HXNBR-1 suspension in water was discharged into an intermediate container.

This procedure of charging of an HXNBR-1 solution, and of precipitation and concentration-by-evaporation, was then repeated twice; on the final occasion, the resultant HXNBR-1 suspension remained within the tank. The HXNBR-1 suspensions from the first two batches were also charged to the tank, and the distillation process was resumed. The pressure was lowered stepwise to 90 mbar, and the wall temperature of the tank was increased to 70° C.

The resultant HXNBR-1 suspension had 25.5% solids content and pH 10.0.

The suspension was then divided into six parts of from 5 kg to 7 kg, and these were successively concentrated by evaporation in a 10 liter stirred container, with stirring, at pressures of from 75 mbar to 250 mbar and wall temperatures of from 50° C. to 55° C., until solids content was 40%. The pH of each batch was monitored and maintained within the range from 9 to 9.5 via addition of diethylamine.

Example 11

Precipitation of HXNBR-1 from Acetonic Solution

Acetonic solution (6400 g) with 3% by weight of HXNBR-1 was placed in a stirred container of capacity 10 L, equipped with a three-stage stirrer. Water (640 g) with 0.2 mol/L of dipropylamine was then added at 20° C. to the acetonic solution over a period of six seconds, with stirring. Acetone and water were then removed by distillation at 20° C. via lowering of the pressure. The particle diameter of the resultant suspension, measured by means of dynamic light scattering (intensity-weighted) was 310 nm, and its solids content was 27.1%.

Examples 12-26

Precipitation of HXNBR-1 from THF Solution 10 g of a THF solution having the content stated in Table 2 of completely dissolved HXNBR-1 served as initial charge in a beaded-rim bottle of capacity 50 ml. Water was added in a ratio by mass of 1:5 (1 part by weight of water for 5 parts by weight of organic phase) with the diethylamine concentration stated in Table 2, by means of a syringe with an addition time of one second, with stirring by a magnetic stirrer and maximum speed. The average particle diameter was then determined by means of dynamic light scattering by using a Zeta-Sizer 3000 HS from Malvern. In all cases, no residue was observed after the precipitation process (yield 100%). For some of the experiments, the solvent was removed as described in Examples 1-8, and the average particle size is likewise stated for those experiments. The experiments were carried out at room temperature and atmospheric pressure.

The average particle diameter of the HXNBR-1 in the suspension from Example 18 was again studied by using dynamic light scattering after removal of the solvent. It was 263 nm.

TABLE 2

Experimental conditions and results; Examples 12-26

| Example | Concentration of HXNBR-1, based on total weight of solution [% by wt] | Concentration of diethylamine in water [g/mol] | Average particle size after precipitation (determined via dynamic light scattering) [nm] |
|---|---|---|---|
| 12 | 1 | 0.117 | 216 |
| 13 | 2 | 0.117 | 237 |
| 14 | 3 | 0.117 | 322 |
| 15 | 4 | 0.117 | 345 |
| 16 | 5 | 0.117 | 310 |
| 17 | 6 | 0.117 | 301 |
| 18 | 7 | 0.117 | 309 |
| 19 | 8 | 0.117 | 336 |
| 20 | 9 | 0.117 | 349 |
| 21 | 10 | 0.117 | 496 |
| 21 | 10 | 0.234 | 349 |
| 22 | 11 | 0.234 | 312 |
| 23 | 12 | 0.234 | 370 |
| 24 | 13 | 0.234 | 340 |
| 25 | 14 | 0.234 | 310 |
| 26 | 15 | 0.234 | 331 |

Examples 27-30

Continuous Precipitation of HXNBR-1 from a THF Solution

The stream of an HXNBR-1 solution in THF was passed through a tube and, by way of a lateral nozzle of diameter 0.2 mm with attachment angle 90°, a stream of basic water which had been adjusted to pH 12.65 by using 0.2 g/mol of diethylamine was added thereto. Immediately downstream of the nozzle, the two streams were further mixed in an SMX static mixer with a length:diameter ratio of 14 and a diameter of 10 mm. The particle size distribution of the product collected was studied by means of laser diffraction (MS 2000 Hydro). The values for $d_{50}$ and $d_{90}$ are stated in Table 3. No concentration-by-evaporation process was undertaken. No coarse fraction was observed in any of the experiments, i.e. the yield was 100%.

TABLE 3

Experimental conditions and results: Examples 27-30

| Example | Concentration of HXNBR-1, based on total weight of solution [% by wt.] | Mass flow of water (with 0.2 mol/L of diethylamine admixed) | Mass flow of HXNBR-1 solution in THF (kg/h) | $d_{50}$ (µm) | $d_{90}$ (µm) |
|---|---|---|---|---|---|
| 27 | 7.5 | 0.585 | 2.96 | 2.52 | 3.56 |
| 28 | 10 | 0.59 | 3.02 | 0.564 | 0.893 |
| 29 | 12 | 0.34 | 1.72 | 0.4 | 0.632 |
| 30 | 12 | 0.42 | 1.7 | 0.178 | 0.356 |

Example 31

Precipitation of HXNBR-1 from THF Solution

Solution (600 g) having 10% of HXNBR-1 in THF served as initial charge in a tank of 1 liter capacity. Water (120 g) into which 0.2 mol/L, of diethylamine had been incorporated by mixing was added over a period of 1 second. The THF was then evaporated at 40° C. and 150 mbar. This gave an HXNBR-1 suspension with solid concentration 37% and pH 10.2.

Example 32

Continuous Precipitation of HXNBR-1 from THF/Water Solution, Work-Up by Way of "Fed Batch"

A polymer solution prepared from 4920.5 g (76.2% by mass) of THF, 1125 g (17.4% by mass) of HXNBR-1 and 114.3 g (6.3% by mass) of water was mixed with a stream of water prepared from 56.5 g (1,88% by mass) of diethylamine and 2943.5 g of water (98.12% by mass), by way of an apparatus identical with that in Examples 27 to 30. The mass flow rate of the polymer solution was 5 kilograms per hour, and the mass flow rate of water-amine mixture was 965 g per hour.

The resultant suspension (792 g) served as initial charge in a one-liter stirred tank, the wall temperature of which was 25° C. The wall temperature was then raised to 45° C., and the pressure was lowered to 220 mbar abs. A further 250 mL of the suspension were added 45 minutes (0:45 h) after the start of the experiment, and this procedure was repeated one hour and thirteen minutes after the start of the experiment (1:13). Further additions each of 250 ml took place 1:58 h, 2:30 h, 3:03 h, 3:46 h, 4:26 h, 5:08 h, 6:00 h and 7:12 h after the start of the experiment, and the total amount of additional suspension added was therefore 2750 ml. Material was removed by distillation during the entire time up to 08:30 h after the start of the experiment. pH at the end of the said first phase was 9.89. In a further phase, distillation was then carried out for a further 11 hours, with lowering of pressure to values of from 130 to 200 mbar abs. At 5:37 h after the start of the second phase when the pH reached was 9.5 12 g of 2.5% by mass solution of diethylamine in water were added. At 8:00 h after the start of the second phase a further 10 g of a 5% by mass diethylamine solution in water were added. During the further course of the experiment, 5 g of a 5% by mass solution of diethylamine in water were again added at 08:09 h after the start of the second phase, and 10 g of a 5% by mass solution of diethylamine in water were again added at 9:59 h after the start of the second phase.

The amount of product finally obtained was 790 g, with 44.2% by mass of HNXBR-1 solid and with a $d_{50}$ value, measured via laser diffraction, of 200 nanometers and a $d_{90}$ value of 630 nanometers.

Example 33

Continuous Precipitation of HXNBR-1 Using Pure Water from THF/DEA Solution, Using "Fed Batch" Work-Up A solution made of 4122.5 g of THF (84.69% by mass), 727.5 g of HXNBR-1 (14.94% by mass) and 10.45 g of diethylamine (0.37% by mass) was prepared. Polymer solution (5 kg/h) was mixed with 1.2 kg/h of deionized water (pH 7) in a system identical with that of Examples 27 to 30. The $d_{50}$ value of the resultant suspension was 134 nanometers and the $d_{90}$ value was 281 nanometers, measured by laser diffraction.

The resultant suspension (571 g) served as initial charge in a 1 L stirred tank, and material was removed by distillation at a wall temperature of 45° C. and at pressures of from 230 to 270 mbar abs. The suspension (2750 ml) was added within a period of ten hours and forty minutes, and then distillation was continued for five hours and 21 minutes at decreasing pressures of from 230 to 105 mbar and at the same wall temperature. During this time, 17 g of aqueous diethylamine solution, concentration 2.5% by mass, were added. The $d_{50}$ value of the resultant suspension was 352 nanometers, and the $d_{90}$ value was 732 nanometers. Final pH was 9.9.

Examples 34 and 35

Precipitation of HXNBR-2 and, Respectively, HXNBR-3 from THF Solution

A solution (600 g) with in each case 10% of the polymers HXNBR 2 and, respectively, HXNBR 3 in THF served as initial charge in a tank of 1 liter capacity. Water (120 g) in which 0.2 mol/L of diethylamine had been incorporated by mixing was added over a period of 1 second. The THF was then evaporated at 40° C. and 150 mbar. Stable suspensions were obtained. The values are shown in Table 4. The pH stated in Table 4 was determined after removal of the THF as stated above on the resultant suspension. The stated viscosity was determined by means of a Brookfield viscosmeter. The average particle diameter stated was determined by means of dynamic light scattering as stated in the description.

TABLE 4

Results of Examples 34 and 35

| Polymer | Solution conc. [% by wt.] | Viscosity [cP] | pH | Average particle diameter [nm] |
|---|---|---|---|---|
| HXNBR 2 | 10 | 376.9 | 9.02 | 71.7 |
| HXNBR 3 | 10 | 67.5 | 9.02 | 78.2 |

Stability of the Suspension According to the Invention:
A Determination of Creaming on Centrifuging The suspension according to the invention from Example 18 with 30% by weight solids content was centrifuged for 40 hours at 1200 g. Transmittance was measured over the height of the sample during the centrifuging process. Creaming was apparent here, i.e. the bottom of the specimen was observed to be clear up to a certain level, which moved upward at a rate of 0.18 mm/hour. The resultant clarification rate for storage of the latex merely under terrestrial gravity is minimal: 1.3 mm/year, a negligible value. The creaming effect was reversible, and the samples removed from the centrifuge were homogeneous. The long-term stability of the suspension according to the invention is therefore very high.
B Light-Backscattering Method to Determine Resistance to Separation, and Photon Correlation Spectroscopy Method to Determine Resistance to Agglomeration
The intermediate sample from Example 9, with 44.6% by mass solids content and with pH 9.2, was stored at 40° C. To determine resistance to separation, backscattering of light from the sample was determined once per week by means of a TURBISCAN ma 2000 from Formulation SA. The measurement took place in a sample vessel with sample height 52 mm. The sample showed absolutely no sign of instability within a period of 6 weeks. Within a period of 13 weeks, the proportion of backscattered light at a height of 45 mm reduced merely from 0.744 to 0.725, and again this decrease is regarded as extremely small. Resistance to agglomeration was determined by means of dynamic light scattering, i.e. average particle diameter was determined prior to and after appropriate storage: within a period of 13 weeks, the average particle diameter determined altered from 234 nm to 217 nm, i.e. it remained constant within measurement tolerances.

Examples 36 and 37

Strength Testing on Resorcinol-Formaldehyde Dips Based on the Suspension Produced in Example 10

To produce the resorcinol-formaldehyde dip ("RFL dip"), the stated amounts of the ingredients listed in Table 5 were admixed in a glass beaker, with gentle stirring, with the suspension obtained in Example 10. An untreated cord textile made of nylon-6,6 was immersed ("dipped") in the resultant solution and then dried at 180° C. for 30 min.

Strips of width 1 cm of crude mixtures based on the mixtures according to Table 6 were then vulcanized onto the polyamide cord (vulcanization temperature 180° C. for 30 min). The bond strength of the rubber samples with respect to the polyamide cord was tested with the aid of a widely used tensile tester from Zwick. These results are shown in Table 6, as also are the results after ageing in hot air for 3, 7 and 14 days. All of the samples here exhibited cohesive fracture within the rubber phase. The strength of the rubber phase is therefore lower than the bond strength between rubber and polyamide cord. The strength of bonding to the polyamide cord is therefore 100%.

TABLE 5

Constitution of a resorcinol-formaldehyde dip using the suspension according to the invention from Example 10
RFL Dip

| | |
|---|---|
| Deionized water | 508 g |
| Ammonium hydroxide (25%) | 10.3 g |
| Penacolite R50 (50%) resorcinol-formaldehyde resin | 55.6 g |
| HXNBR-1 suspension from Example 10 (40%) | 407.0 g |
| Formaldehyde (37%) | 18.5 g |
| Total | 1000.0 g |

TABLE 6

Crude mixture constitution and bond strengths of the vulcanized crude mixtures with respect to the polyamide cord treated with the RFL solution described above

| | | Example 36 | Example 37 |
|---|---|---|---|
| Constitution of crude mixture | | | |
| Therban ® A 3407 | | 100 | 75 |
| Therban ® ART KA 8796 | | | 50 |
| Corax ® N550 | | 50 | 35 |
| Vulkasil ® A1 | | | 10 |
| ZnO | | 3 | |
| Maglite ® DE | | 3 | 2 |
| Luvoma$^{xx}$ ® CDPA | | 1.1 | 1.1 |
| Vulkanox ® ZMB2 | | 0.4 | 0.4 |
| TAIC | | 1.5 | |
| Perkadox ® 14/40 | | 7 | 8 |
| Bond strength of the vulcanized crude mixtures on polyamide cord | | | |
| Starting point | Average value of separation force [N/mm] | 4.7 | 5.6 |
| 3 d at 150° C. | Average value of separation force [N/mm] | 5.8 | 5.7 |
| 7 d at 150° C. | Average value of separation force [N/mm] | 4.7 | 5.1 |
| 14 d at 150° C. | Average value of separation force [N/mm] | 4.7 | 3.6 |

What is claimed is:

1. An aqueous suspension of a carboxylated, completely or partially hydrogenated nitrite rubber with an emulsifier content of less than 1 part by weight, based on 100 parts by weight of the carboxylated, completely or partially hydrogenated nitrile rubber, wherein the average particle diameter of the carboxylated, completely or partially hydrogenated nitrite rubber in the suspension is in the range from 0.01 to 0.9 micrometer, measured by means of dynamic light scattering.

2. The aqueous suspension according to claim 1, wherein the average particle diameter of the carboxylated, completely or partially hydrogenated nitrile rubber in the suspension is in the range from 0.05 to 0.8 micrometer; measured by means of dynamic light scattering.

3. The aqueous suspension according to claim 1, wherein the particle diameter $d_{50}$, determined via laser diffraction (intensity-weighted) is in the range from 0.01 micrometer to 0.9 micrometer.

4. The aqueous suspension according to claim 1, in which the solids concentration of the carboxylated, completely or partially hydrogenated nitrile rubber is from 5% to 65% by weight.

5. The aqueous suspension according to claim 1, comprising less than 0.5 parts by weight, of emulsifier, based on 100 parts by weight of the carboxylated, completely or partially hydrogenated nitrile rubber.

6. The aqueous suspension according to claim 1, comprising less than 0.09 parts by weight, of emulsifier, based on 100 parts by weight of the carboxylated, completely or partially hydrogenated nitrile rubber.

7. The aqueous suspension according to claim 1 comprising a carboxylated, completely or partially hydrogenated nitrile rubber which has repeating units derived from at least one conjugated diene, from at least one α,β-unsaturated nitrile and from at least one further carboxylated, copolymerizable monomer, where this monomer either has at least one carboxy group in the monomer molecule or reacts in situ with release of at least one carboxy group, wherein at least 50% of the C=C double bonds of the diene monomer incorporated into the polymer have been hydrogenated.

8. A process for the coating of a substrate material comprising bringing the aqueous suspension according to claim 1 into contact with the substrate material.

9. The process according to claim 8, wherein the substrate material is selected from the group consisting of plastics, metals and fibres.

10. The process according to claim 8, wherein the substrate material is selected from the group consisting of glass fibres, metal fibres, and synthetic organic fibres.

11. The process according to claim 8, wherein the suspension is used in the form of a binder composition which also comprises a mixture comprising resin and/or hardener and optionally one or more other rubber additives.

12. A binder composition comprising
   a) a suspension according to claims 1, and
   b) a mixture comprising resin and/or hardener,
   c) optionally one or more other rubber additives, preferably crosslinking agents, crosslinking accelerators and fillers, in particular carbon black or mineral filler.

13. The binder composition according to claim 12. comprising a mixture b) containing a resin selected from the group consisting of resorcinol/formaldehyde, resorcinol/chlorophenol/formaldehyde, isocyanates, capped isocyanates, urea derivatives and mixtures thereof.

14. A coated substrate material obtainable by the process according to claim 8.

15. A process for producing composite materials, wherein the coated substrate material according to claim 14 is embedded and vulcanized into a mixture of one or more other rubbers and auxiliaries.

16. The process according to claim 15, wherein the rubbers have been selected from the group consisting of one or more NR, BR, SBR, EPM, EPDM, ECO, EVM, CSM, ACM, VMC, FKM, NBR, HNBR and any mixtures thereof and the auxiliaries are selected from the mixture consisting of one or more fillers, crosslinking agents, crosslinking accelerators and mixtures thereof.

17. A composite material obtainable by the process according to claim 15.

* * * * *